Feb. 12, 1952     W. H. HARRISON     2,585,245
COLOR TEMPERATURE AND EXPOSURE METER
Filed July 15, 1949
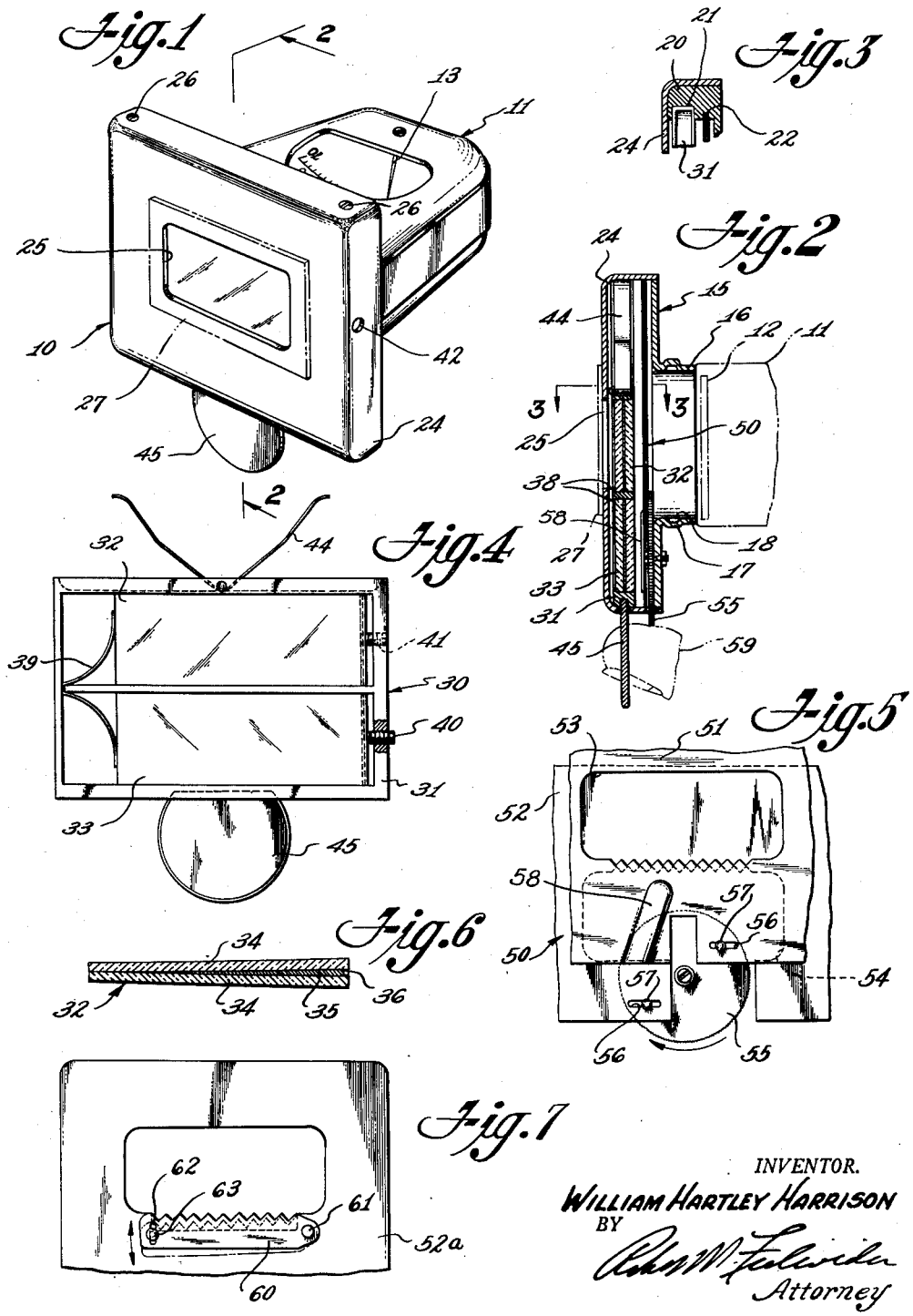
INVENTOR.
WILLIAM HARTLEY HARRISON
BY
*Attorney*

Patented Feb. 12, 1952

2,585,245

UNITED STATES PATENT OFFICE 2,585,245

COLOR TEMPERATURE AND EXPOSURE METER

William H. Harrison, Los Angeles, Calif.

Application July 15, 1949, Serial No. 104,877

16 Claims. (Cl. 88—22.5)

My invention relates generally to photometric apparatus, and more particularly to an instrument for measuring the color quality of light in terms of color temperature. While previous apparatus has been designed for measuring color temperature of light, it has usually been quite complicated and in many cases has had the further disadvantage of depending for its accuracy to a large extent on human judgment. Meters of the latter type are often constructed with a large number of filters of varying density and color, and a scene to be photographed is viewed through an aperture over which the filters may be placed, and the filters adjusted to produce a certain effect on the human eye. The color sensitivity of the human eye varies from person to person, however, and for this reason, meters which rely on human judgment are not capable of the extreme accuracy required in color photography.

Attempts have been made to overcome the foregoing difficulty by employing photocells in place of the human eye in observing the color of incident light and the effect of filters thereon, but photoelectric color meters heretofore available have been quite expensive, due to the fact that the photocells employed must be selected for a particular range of color sensitivity and the meter carefully balanced by a selection of the proper cell and filters. A further disadvantage of the photoelectric color meters heretofore available is the fact that they are quite complicated to operate and require a number of separate readings and adjustments before the final result is obtained.

With the foregoing difficulties in mind, it is a major object of the present invention to provide a photoelectric color meter which is in the form of a relatively simple attachment to be used with conventional photoelectric light meters commonly known as exposure meters.

Another object of the invention is to provide a color temperature meter of the class described which may be readily adjusted to suit the color sensitivity characteristics of substantially any photoelectric cell with which it may be used.

Still another object of the invention is to provide a photometer which is extremely simple to operate and may be used by amateur photographers without the necessity of elaborate instruction and practice in its use.

A further object of the invention is to provide a color meter which may be read directly in terms of color temperature whereby it may be used directly in connection with conventional color films without the necessity of translating the readings of the meter by use of elaborate charts, graphs and calculations.

An additional object of the invention is to provide an exposure meter for use in color photography with which exposure data may be obtained which are correctly related to the spectral sensitivity range of the film being used and the light reaching the subject.

The foregoing and additional objects and advantages of the invention will be apparent from a consideration of the following detailed description thereof, the invention being embodied in an attachment for a conventional light meter.

Briefly, the color temperature meter embodying the present invention involves the measurement of the relative intensity of two narrow color bands, one of such bands being in the red zone near one end of the visible spectrum, and the other being in the blue range near the other end of the visible spectrum. Experience has shown that by knowing the relative intensity of light of two widely separated and narrow spectral bands as above described, a camera lens can be balanced by the use of filters of appropriate color and density so that the pictures taken on a particular color film will have the optimum distribution of color sensitivity and thus produce a natural-appearing color photograph.

Most modern color films are formulated or "balanced" for use with light of a particular color temperature. For example, some films are designed for use in normal daylight, i. e., light of approximately 5900 K. Film for use with tungsten incandescent lights is balanced for a color temperature of approximately 3200 K. Film for use with photoflood light is balanced at approximately 3400 K.

Thus, if measurement of the source of light illuminating a particular scene to be photographed in color reveals that the color temperature is, let us say, 4300 K. and the film to be used is balanced for daylight, i. e., 5900 K., a blue filter of sufficient intensity is placed in front of the camera lens whereby to compensate for the "reddish" characteristics of the light as compared with daylight. When such a filter is used, the resulting color photograph will closely approach the result that would be obtained if the scene had been illuminated with daylight at 5900 K.

In addition to the desiderata above listed, it is desirable that the meter at present under discussion, and in fact exposure meters in general, be constructed with standard printed scales and that individual hand calibration of scales of different meters be avoided. Because of certain inherent variables in photocells now commercially available, it has been in the past necessary to individually calibrate photoelectric color exposure meters. Other variable characteristics in the elements employed in color meters further complicate the quantity production thereof. In general, the variables contended with are as follows: variations in the density and selectivity of color filters from one set to another; variations in the color selectivity characteristics or photocells from one to another; variations in overall output or response from one cell to another; variations in microammeter sensitivity from one to another.

An additional advantage of the present construction is the fact that it provides for a number of different adjustments by which it is possible to compensate for all of the above variables, or substantially any combination or permutation thereof, and reduce the deflection of the meter to one which can be read against a standard printed scale which is the same for all meters.

For a more detailed description of the attachment embodying the present invention, reference should now be had to the attached drawings in which:

Figure 1 is a perspective view of the color temperature attachment secured to a conventional exposure meter;

Figure 2 is an elevational section taken on the line 2—2 in Figure 1, the conventional exposure meter being shown in phantom line;

Figure 3 is a horizontal section taken on the line 3—3 in Figure 2;

Figure 4 is an elevational view of a filter assembly forming a part of the construction illustrated in Figure 1;

Figure 5 is a fragmentary elevational view of a shutter assembly employed in the construction shown in Figure 1;

Figure 6 is a horizontal section taken on the line 6—6 in Figure 4; and

Figure 7 is an elevational view of a modified form of one of the shutter blades employed in the construction shown in Figure 5.

In the drawings, the attachment is indicated generally by the reference character 10 and is secured to a conventional exposure meter 11, the latter having a photocell 12 connected to actuate a sensitive electric current indicator 13, in the present case a microammeter, in accordance with the intensity of light striking the photocell 12. The construction of such photoelectric exposure meters being well known in the art, no further description is needed herein.

The attachment 10 includes a flared base member 15, having a rectangular tubular portion 16 adapted to snap over the forward end of the exposure meter 11, and having suitable detents 17 formed therein to engage projections 18 formed in the forward end of the exposure meter 11. The base member 15 is formed with forwardly projecting, vertically disposed track members 20 (see Figure 3), each of which has formed therein vertical channels 21 and 22, the purpose of which is to receive the vertically slidable filter assembly and vertically slidable shutter blades, as will hereinafter be described.

The attachment 10 is enclosed with a pan-like cover 24 which has a rectangular aperture 25 formed therein, in alignment with the photocell 12. The cover 24 is held in place by screws 26 threaded into the track members 20. A diffusing screen, such for example as a plate of ground glass or translucent plastic material, may in some instances be secured to the front surface of the cover 24, covering the aperture 25, as indicated by the reference character 27. The diffusing screen 27 may be cemented to the cover 24 or secured thereto in any other suitable manner.

Positioned within the space between the base member 15 and the cover 24 is a wedge-filter assembly 30, illustrated in Figure 4. The assembly 30 comprises a frame 31 having two horizontally disposed, rectangular openings therein, each of which receives a wedge-filter and mounts the same for limited sliding motion back and forth in the rectangular opening. The uppermost wedge 32 is blue and the lowermost 33 is red. While this arrangement is convenient in the present design, it will be obvious that the positions of the wedges can be reversed if desired, necessitating only a revision in the meter scale or conversion tables as will hereinafter appear.

The elements 32 and 33 are constructed as optical wedges, that is, the optical density increases along the horizontal axis thereof, the construction giving rise to this characteristic being illustrated in Figure 6. Here it will be seen that the wedge, for example 32, is constructed of two glass plates 34 having colored thermoplastic material 35 disposed therebetween and being wedged apart by a small wire 36 disposed at one end of the filter plates whereby to thicken the thermoplastic layer 35 at this end. Thus, referring again to Figure 6, it will be seen that the wedge is relatively transparent at the left end and relatively dense at the right end. The thermoplastic material 35 serves also as an adhesive to secure the two plates 34 together.

While the wedge-filter 30 just described has been found suitable for use in the present structure, it will be realized that various other types of optical wedges constructed of solid glass or solid plastic material may be employed with equal efficacy.

The frame 31 is formed with flanged rails, as indicated at 38 in Figure 2, so as to form horizontal guides for the wedges 32 and 33, in which the latter may slide horizontally within the frame 31. A curved leaf spring 39, mounted within the frame 31 and having its ends bearing against the wedges 32 and 33, urges the latter to the right (as in Figure 4). The wedges 32 and 33 abut at their right ends against adjustment screws 40 and 41 so that the lateral position of the filter 32 may be adjusted by turning the adjustment screws 40 or 41. An aperture 42, formed in the cover 24, gives access to the screws 40 and 41, the entire frame 31 being moved upwardly or downwardly to place the desired screw 40 or 41 opposite the aperture 42.

The frame 31 is urged downwardly in the tracks 21 by a leaf spring 44, secured to the upper end of the frame 31 and anchored against the underside of the top flange of the cover 24. A downwardly projecting disc-shaped handle 45 is secured to the bottom edge of the frame 31 and projects downwardly through a slot in the cover 24, whereby the filter-carrying frame 31 may be pushed upwardly to a position where the lowermost or red wedge 33 overlies the photocell 12, or selectively, the frame may be allowed to drop downwardly under the urging of the spring 44 so that the upper or blue wedge 32 overlies the photocell 12.

Between the filter frame 31 and the photocell 12 is a two-bladed adjustable shutter assembly, indicated generally by the reference character 50, and illustrated in Figure 5. In general, the operation of the meter consists in comparing readings of the intensity or flux value of two different colors of light, one taken through the red wedge and the other taken through the blue wedge. While such a comparison could be made arithmetically from the absolute values of the two different colors, as will be described hereinafter, such comparison readings are preferably obtained by first adjusting the amount of light reaching the cell so as to obtain a standard "reference" reading with one filter in front of the cell and then comparing that reading with the reading obtained with the other wedge in front of the cell, all other adjustments being unchanged. The purpose of the shutter 50 is to adjust the amount of light reaching the cell to determine the "reference" reading above mentioned.

The two blades 51 and 52 of the shutter assembly 50 are mounted face-to-face in the channel 22 and are independently slidable therein. Each of the blades 51 and 52 has a generally rectangular opening 53 and 54 (respectively) formed therein, the size and disposition of the openings 53 and 54 being such that when the two blades 51 and 52 are slid toward each other, the openings coincide and substantially all of the sensitive surface of the photocell 12 is exposed, whereas when the two blades are slid in opposite directions to the position indicated in Figure 5, the shutter is closed and the photocell 12 covered. As can be seen best in Figure 5, the lower edge of the aperture 53 and the upper edge of the aperture 54 are serriform whereby to reduce the rate of light reduction for a given shutter movement when the blades are close together as compared to the rate when they are relatively widely spaced.

The coordinate movement of the two shutter blades 51 and 52 is accomplished by means of knurled operating disc 55 rotatably mounted on the base member 15 below the optical axis in the position indicated in Figures 2 and 5. Each of the shutter blades 51 and 52 is linked to the operating disc 55 by means of a slot 56, formed in the shutter blades, and a pin 57 projecting into the slot 56 and secured to the disc 55. As best seen in Figure 5, the operating pins 57 are diametrically opposed on the disc 55 so that when one is moving up due to the rotation of the disc, the other moves downwardly. Thus, as the disc 55 is rotated in one direction, the two blades 51 and 52 are brought together to close the aperture, whereas when the disc 55 is rotated in the opposite direction, the blades are moved apart to open the aperture. Since the blades 51 and 52 are in close sliding contact, the pin 57 would strike the overlying blade 51 if the latter were flat over its entire area. Accordingly, the blade 51 is coined or die stamped to form an arched recess 58 disposed to clear the pin 57, as shown in Figures 2 and 5.

From an examination of Figures 2 and 5, it will be noted that the size and disposition of the handle disc 45 of the filter frame 31, and the shutter-operating disc 55 are such that when the disc 45 is pressed to its uppermost position, the two discs are in substantial alignment whereby the shutter-operating disc 55 may be rotated in one direction or the other with the same finger that is used to raise the filter frame handle 45. Such operation is illustrated in phantom line in Figure 2, and indicated by the reference character 59.

As will be hereinafter described in more detail, it is sometimes desirable that the shutter close at one end before the other end is completely closed. For this purpose, a modified form of shutter blade, illustrated in Figure 7, is provided. Here it will be seen that an edge portion 60 of a modified shutter blade 52a is secured to the shutter blade by a pivot pin 61 at one end and a semicircular slot 62 and set screw 63 at the other end. Thus, by loosening the set screw 63, the edge portion 60 may be swung about the pivot 61 whereby to slope the edge of the shutter aperture in one direction or the other as may be desired.

Having set forth the construction of the invention, the operation is as follows. Initially, the attachment 10 must be adjusted to suit the particular photocell in the exposure meter 11. Such adjustment is accomplished in general by appropriate rotation of the adjustment screws 40 and 41 to effect lateral movement of the wedge-filters 32 and 33 to an adjusted position in which they may be locked by additional set screws (not shown). Once the attachment 10 has been adjusted to suit the particular photocell 12 involved, it is unnecessary to repeat this initial adjustment until it is desired to use the attachment in connection with a different photocell.

When using the meter in the manner to be described hereinafter, it is desirable that a certain standard color of light be established, i. e., a color temperature which will cause no deflection of the meter when the wedge-filters are alternated in front of the cell. For practical uses, the standard color temperature is selected as approximately 3200° K. which is approximately the color temperature of light emitted by tungsten incandescent lamps. Since most of the important variations from the above standard will be in the direction of blue, it is desirable to position the "reference" reading of the meter obtained from such standard somewhere between the zero end of the scale and the center of the scale, and to make the shutter adjustment to obtain the "reference" reading with the red wedge in place in front of the cell. Accordingly, a light standard of approximately 3200° K. is employed and two wedge-filters are first adjusted so that no deflection of the meter from the reference point is obtained when the wedge-filters are alternated.

The initial adjustment is made in two stages by using standard light sources in which the relative intensities of the blue and red light are known, or in other words, light sources of known color temperature. With the exposure meter and attachment disposed to receive the light from the first of the above-mentioned light sources (3200° K.), the two filter-wedges are adjusted laterally until the meter "reference" reading is obtained with the blue wedge in front of the photocell, as well as with the red wedge in front of the cell 12, i. e., there is no deflection when the wedges are alternated.

The adjustment just described creates the proper relationship of the wedges themselves and also compensates for the color characteristics of the photoelectric cell as well as the output of the micro-ammeter 13 in relation to the printed scale.

After having established the "reference" reading as just described, the instrument is then checked against the second standard light source which has a different but known color temperature. It may then be found that the reading of the meter, i. e., the deflection from the reference when the wedges are alternated, is either too small or too great to match the indications of the printed scale with the known color characteristics of the second light standard. This result may be due either to an erroneous output of the photo cell (too high or too low) or improper sensitivity of the micro-ammeter 13. In either event, the error is corrected by moving both wedges simultaneously in the same direction. If both wedges are moved in a direction to place the least dense end over the cell, the deflection of the meter (the change in position of the needle) when the wedges are alternated will be decreased, whereas if the wedges are moved along their wedge axes so as to place the dense end over the cell, the spectral selectivity of each wedge-filter, i. e., the "spectral cut" as it is sometimes called, will be increased and the result will be to increase the deflection of the needle. By appropriate simultaneous movement of the wedges along the horizontal axes, the final phase of the initial adjustment is accomplished and the meter is adjusted to read against a predetermined printed scale, thus obviating the necessity of calibrating each scale independently for each particular meter of photocell.

As above stated, photocells often vary in their spectral sensitivity over their area, that is, for example, the center of the cell may be more blue-sensitive than the outer edges. Thus, in the present instance, when such a cell was encountered, the opening and closing of the shutter 50 might not only change the intensity of light reaching the cell but might change the effective sensitivity thereof by restricting the area exposed, to one which has a different than average sensitivity. To minimize this effect, the pivotal shutter edge pieces 60 may be adjusted to various angles (one piece 60 being provided on each shutter blade) so that the shutter closes at an angle across the cell rather than directly across. Thus, any change in spectral sensitivity between the edge and the center of the cell can be compensated for.

It will be noted that the transverse dimension of the wedge-filters 32 and 33 is considerably greater than that of the aperture 25 so that a considerable latitude of adjustment of the wedge-filters is provided for. Once adjusted to the correct lateral position, the effectiveness of the particular wedge-filter in front of the photocell is, of course, that of the average thickness of the thermoplastic 35 across the width of the aperture 25. If, however (as is often the case), the photocell 12 is predominately blue-sensitive, a further initial adjustment may be necessary so that the relative effect of the wedge-filters will be uniform for all openings of the shutter assembly 50. Such further adjustment is accomplished as above stated by properly sloping the shutter edge members 60 so that the relative meter readings for the two positions of the filter frame 31 are substantially correct for all openings of the shutter. This latter adjustment, like the former, need only be made once for any particular photocell.

In connection with the initial adjustments above described, it should be noted that while the wedge axis is shown as horizontal in the present embodiment, it can be made vertical, that is, so that the wedges change in intensity along their vertical axes. With vertical axis wedges, the initial adjustment is made by providing stops for the filter frame which limits the vertical movement of the frame at such points as place the appropriate area of the filter in front of the cell.

Having made the initial adjustments above described, the actual use of the attachment is as follows. The meter is held at or near the position of the subject to be photographed and directed toward the camera. Thus, the illumination reaching the diffusion screen 27 is that which will reach the subject and also effect the photograph. With the meter in this position, the frame 31 is moved to its uppermost position to place the red wedge over the photocell, such manipulation being by pressing upwardly on the handle 45. With the frame 31 in this uppermost position, the shutter operating disc 55 is then manipulated to open or close the shutter to a position where the predetermined "reference" reading is obtained on the meter 13. Thereupon, the frame 31 is allowed to drop by removing the pressure on the handle 45, thus bringing the blue wedge in front of the photocell. The reading then obtained with the blue wedge in position when compared to the predetermined reading just described, gives the color temperature of the incident light. If the predetermined "reference" reading is used for the red light measurement, the meter may be calibrated directly in color temperature units, e. g., Kelvins. Knowing the color temperature of the incident light, it is then possible to readily adjust the camera by placing an appropriate filter in front of the camera lens so as to bring the color balance of the particular film then in use into agreement with the color proportions or color temperature of the incident light.

Although the present embodiment of the invention is one in which the red wedge is used to establish the predetermined reference setting, the operation can be reversed and the blue wedge used to establish a reference setting and replaced with the red wedge to determine the relative reading.

While the presently preferred means for adjusting the reading of the micro-ammeter to the "reference" point on the scale is the shutter 50, it will be realized by those skilled in the art that the same result can be achieved by introducing a variable electrical resistance between the photocell and the meter. Adjusting the value of such resistance will cause the meter reading to change in the same manner as adjustment of the opening of the shutter 50.

An additional datum which is desirable in color photography is the correct exposure time. Such a reading is obtained with the present attachment by opening the shutter assembly 50 to its full-open position (or, if desired, to a predetermined marked position), and with the attachment in this condition, taking two readings of the incident light, one with the blue wedge in position and one with the red wedge in position. The arithmetic average of these two readings is the mean average color intensity of the incident red and blue light and not the average ordinarily given by the photoelectric cells which are normally excessively blue sensitive. From this mean average reading, a more accurate exposure time may be calculated than is usually obtained with an unmodified exposure meter.

While the forms of the attachment shown and described herein are fully capable of achieving the objects and providing the advantages hereinbefore stated, it will be realized that they are capable of considerable modification without departing from the spirit of the invention. Therefore, I do not wish to be restricted to the forms shown and described herein, but rather to the scope of the appended claims.

I claim:

1. In an exposure meter of the class having a photoelectric cell connected to actuate an electric current indicator, an attachment for making color temperature measurements comprising: a frame having transverse rails formed therein to support a pair of light transmitting members in side-by-side relationship for independent parallel movement in the plane of said frame; a pair of differently colored optical wedges supported in said rails with their wedge axes in said plane, parallel to each other, and parallel to said tracks, each of said wedges being colored to transmit a predetermined relatively narrow spectral band of light, said bands being relatively widely separated in the visual spectrum and the dimensions along the wedge axis of each of said wedges being greater than the width of said cell; a base member having means to detachably secure the same to said meter adjacent said cell and tracks to slidably support said frame with the plane thereof substantially perpendicular to rays of light reaching said cell and for sliding movement of said frame in said plane between limits in which one or the other of said wedges overlies said cell and whereby said wedges may be independently moved along said rails to vary the average density of said wedge overlying said cell; a shutter disposed between said frame and cell, said shutter including a pair of blades disposed with their adjacent edges substantially perpendicular to said frame movement and mounted in said base for selective movement toward or away from each other whereby to reduce or increase respectively, the area of said cell exposed to light passing through said overlying wedge; an operating handle secured to said frame and adapted for digital pressure to move said frame to one limit of said movement thereof; and a rotatable operating member linked to said shutter blades to effect concurrent convergent or divergent movement of said blades when said member is rotated, said operating member being disposed behind the plane of said frame and in alignment with said handle thereof when said frame is in said last mentioned limit position whereby said operating member is readily accessible for operation when said frame is in said last mentioned position and difficult of access when said frame is in the other limit position.

2. The construction of claim 1 further characterized in that each of said shutter blades is formed with a pivotable edge portion whereby to adjust the angle between the edge of said blade and the direction of movement thereof.

3. The construction of claim 1 further characterized in that said optical wedges each comprise a pair of flat, non-parallel transparent plates in substantial contact at one end thereof, said plates being bonded together by a colored transparent thermoplastic material.

4. The construction of claim 1 further characterized by having yielding means disposed between said base and frame to urge the latter toward the limit position thereof opposite that in which said handle and operating member are aligned.

5. In an exposure meter of the class having a photoelectric cell connected to actuate an electric current indicator, an attachment for making color temperature measurements comprising: a frame supported on said meter adjacent said cell for selective movement to either of two alternate positions; a pair of optical wedges, each colored to transmit a different one of two spectral bands adjacent opposite ends of a predetermined spectral range, said wedges being carried by said frame for concurrent movement therewith, each of said wedges being positioned to overlie said cell and intercept all light reaching the same when said frame is in one of said alternate positions, and each of said wedges being independently movable with respect to said frame whereby to adjust the average color density of the wedge overlying said cell; and means including a manually adjustable element operatively connected to said exposure meter to adjust to a predetermined reference value the reading of said indicator resulting from a given light flux reaching said cell through one of said overlying wedges whereby the reading of said indicator with the other of said wedges over said cell is directly proportional to the color temperature of said given light.

6. In an exposure meter of the class having a photoelectric cell connected to actuate an electric current indicator, an attachment for making color temperature measurements comprising: a frame supported on said meter adjacent said cell for selective movement to either of two alternate positions; a pair of differently colored optical wedges, each colored to transmit a different one of two spectral bands adjacent opposite ends of a predetermined spectral range, said wedges being carried by said frame for movement therewith, each of said wedges being positioned to overlie said cell and intercept all light reaching the same when said frame is in one of said alternate positions, and each of said wedges being independently movable with respect to said frame whereby to adjust the average color density of the wedge overlying said cell; and shutter means positioned in front of said cell and adapted to vary the total light flux reaching said cell through said overlying wedge.

7. In an exposure meter of the class having a photoelectric cell connected to actuate an electric current indicator, an attachment for making color temperature measurements comprising: a frame supported on said meter adjacent said cell for selective movement to either of two alternate positions; a pair of differently colored optical wedges, each colored to transmit a different one of two spectral bands adjacent opposite ends of a predetermined spectral range, said wedges being carried by said frame for concurrent movement therewith, each of said wedges being positioned to overlie said cell and intercept all light reaching the same when said frame is in one of said alternate positions, and each of said wedges being independently movable with respect to said frame whereby to adjust the average color density of the wedge overlying said cell; and electrical resistance means interposed between said cell and current indicator adapted to adjust to a predetermined value, the reading of said current indicator resulting from a given light flux impinging on said cell.

8. In a color temperature meter, the combination of: a photocell having a light receiving aperture of given area and a known relative color sensitivity; an electric current indicator connected to receive the electrical output of said cell whereby to indicate the light flux impinging thereon; and a pair of optical color wedges, each having an area greater than said aperture, said wedges being mounted for concurrent movement to alternate limit positions wherein a portion of one or the other of said wedges overlies said cell and intercepts all light rays impinging thereon, said wedges each being colored to transmit a predetermined spectral band of light, said bands being adjacent the opposite ends of the visual spectrum and said wedges in addition to being concurrently movable, being independently and relatively movable to vary the average color density of the wedge portion overlying said cell so that with a light of known selected standard color temperature intermediate said bands impinging through either of said wedges onto said cell, the indicated light flux is the same irrespective of which wedge overlies said cell whereby the color temperature of measured light reaching said cell is determined relative to said standard color temperature by the deflection of said current indicator when said wedges are alternated in front of said cell to alternately intercept said measured light.

9. In a color temperature meter, the combination of: a photocell having a known relative color sensitivity; an electric current indicator connected to receive the electrical output of said cell whereby to indicate the light flux impinging thereon; a pair of optical color wedges mounted for concurrent movement to alternate limit positions wherein one or the other of said wedges overlies said cell and intercepts all light rays impinging thereon, said wedges each being colored to transmit a predetermined spectral band of light, said bands being adjacent the opposite ends of visual spectrum and said wedges in addition to being concurrently movable, being relatively movable to vary the average color density of the wedge overlying said cell so that with a light of known selected standard color temperature intermediate said bands impinging through either of said wedges onto said cell, the indicated light flux is the same irrespective of which wedge overlies said cell whereby the color temperature of measured light reaching said cell is determined relative to said standard color temperature by the deflection of said current indicator when said wedges are alternated in front of said cell to alternately intercept said measured light; and shutter means secured in fixed relation to said cell and overlying the same, said shutter means being adjustable to vary the total light reaching said cell through said overlying wedge.

10. In a color temperature meter, the combination of: a photocell having a known relative color sensitivity; an electric current indicator connected to receive the electrical output of said cell whereby to indicate the light flux impinging thereon; a pair of light transmitting elements mounted for concurrent movement to alternate positions wherein one or the other of said elements overlies said cell and intercepts all light rays impinging on the same, said elements each being colored to transmit a predetermined spectral band of light, said bands being separated in the visual spectrum and adjacent the opposite ends thereof, and said elements being adjusted in relative density so that with a light of known selected standard color temperature intermediate said bands impinging on said cell, the light flux indicated by said indicator is the same irrespective of which element overlies said cell, whereby the color temperature of measured light reaching said cell is determined relative to said standard color temperature by the deflection of said current indicator when said elements are alternated in front of said cell to alternately intercept said measured light; and shutter means secured in fixed relation to said cell and overlying the same, said shutter means being adjustable to vary the total light reaching said cell through said overlying element, and including at least one blade movable across the area of said cell, said blade having an angularly adjustable edge portion whereby to adjust the order in which predetermined areas of said cell are obscured as said blade is moved across the same.

11. A color temperature meter comprising in combination: a photocell having a light receiving aperture of predetermined area; an indicator connected to said photocell to indicate the electrical output thereof; a support movably mounted adjacent said photocell for movement from one alternate position to another; a pair of light transmitting members carried by said support, each having an area substantially greater than said aperture area and so positioned on said support that in one of said alternate positions a portion of a first of said elements overlies said aperture and in the other of said positions the other of said elements overlies said aperture, each of said elements being colored to transmit predominantly a different substantially monochromatic spectral band, said bands being at opposite ends of a predetermined color temperature range and at least the first of said elements having progressively increasing color density along a given direction; and means to move said first element independently in said direction with respect to said support to place a different portion of said element over said aperture whereby to vary the degree of monochromatism of light reaching said photocell when said first element is positioned to overlie said photocell.

12. The construction of claim 11 further characterized by having an adjustable shutter mounted in front of said aperture to vary the total light reaching the same through said overlying element.

13. The construction of claim 12 further characterized by having a member for manually adjusting said shutter, said adjusting member being positioned adjacent the path of movement of said support whereby to be readily accessible only when said support is in a given one of said alternate positions.

14. In an exposure meter of the class having a photoelectric cell connected to actuate an electric current indicator, an attachment for making color temperature measurements comprising: filter means mounted adjacent said cell for movement to either of two alternate positions; a pair of differently colored light transmitting elements carried in said filter means and positioned therein to alternately overlie said cell when said filter means is moved as aforesaid, the colors transmitted by said elements being at opposite ends of a given spectral range, and at least one of said elements being of progressively greater color density along a given direction whereby to transmit light of relatively greater monochromatic purity at one portion than another, said last-named element being of greater effective area than said cell; and means to move said last-named element independently with respect to said filter means in said direction to place differing portions of said last-named element over said cell to vary the monochromatic purity of light reaching said cell through said last-named element.

15. The construction of claim 14 further characterized by having obscuring means mounted adjacent said cell and independent of said filter means to adjustably vary the amount of light reaching said cell, 16. In combination with an exposure meter of the class having a photoelectric cell connected to actuate an electric current indicator, an attachment for making color temperature measurements comprising: a frame supported on said meter adjacent said cell for selective movement to either of two alternate positions; a pair of differently colored optical wedges, each colored to transmit a different one of two spectral bands adjacent opposite ends of a predetermined spectral range, said wedges being carried by said frame for movement therewith, each of said wedges being positioned to overlie said cell and intercept all light reaching the same when said frame is in one of said alternate positions, and each of said wedges being independently movable with respect to said frame whereby to adjust the average color density of the wedge overlying said cell; and shutter means positioned in front of said cell and adapted to vary the total light flux reaching said cell through said overlying wedge, said shutter means including a calibrated operating movement whereby said light flux may be adjusted to a predetermined value.

WILLIAM H. HARRISON.

REFERENCES CITED

The following references are of record in the file of this patent:

UNITED STATES PATENTS

| Number | Name | Date |
|---|---|---|
| 1,898,219 | Sharp | Feb. 21, 1933 |
| 2,050,608 | Hellige | Aug. 11, 1936 |
| 2,462,823 | Woodward | Feb. 22, 1949 |

FOREIGN PATENTS

| Number | Country | Date |
|---|---|---|
| 600,440 | Great Britain | Apr. 8, 1948 |